(12) United States Patent
Yokoyama

(10) Patent No.: US 10,927,991 B2
(45) Date of Patent: Feb. 23, 2021

(54) WELD FITTING

(71) Applicant: MIRAIAL CO., LTD., Tokyo (JP)

(72) Inventor: Makoto Yokoyama, Tokyo (JP)

(73) Assignee: MIRAIAL CO., LTD., Tokyo (JP)

( * ) Notice: Subject to any disclaimer, the term of this patent is extended or adjusted under 35 U.S.C. 154(b) by 429 days.

(21) Appl. No.: 14/903,215

(22) PCT Filed: Jul. 22, 2013

(86) PCT No.: PCT/JP2013/069837
§ 371 (c)(1),
(2) Date: Jan. 6, 2016

(87) PCT Pub. No.: WO2015/011776
PCT Pub. Date: Jan. 29, 2015

(65) Prior Publication Data
US 2016/0153599 A1    Jun. 2, 2016

(51) Int. Cl.
*F16L 47/02* (2006.01)
*B23K 37/04* (2006.01)
(Continued)

(52) U.S. Cl.
CPC .............. *F16L 47/02* (2013.01); *B23K 31/02* (2013.01); *B23K 33/006* (2013.01);
(Continued)

(58) Field of Classification Search
CPC ....... F16L 13/02; F16L 43/008; F16L 43/001; F16L 47/02; F16L 2201/60; F16L 27/08;
(Continued)

(56) References Cited

U.S. PATENT DOCUMENTS 169,699 A * 11/1875 Hazelton ................. F16L 58/16
138/145
1,293,871 A * 2/1919 Murray ............... F16L 13/0236
114/79 W
(Continued)

FOREIGN PATENT DOCUMENTS

| JP | 2000-161544 A | 6/2000 |
| JP | 2008-69880 A | 3/2008 |
| JP | 2012-67864 A | 4/2012 |

*Primary Examiner* — Aaron M Dunwoody
(74) *Attorney, Agent, or Firm* — Muncy, Geissler, Olds & Lowe, P.C.

(57) ABSTRACT

A heat-weldable weld fitting that has a cylindrical fitting main body portion. The cylindrical fitting main body portion includes an outer periphery including a first end portion, a second end portion, and a middle section between the first end portion and the second end portion, and positioning scales formed at equal intervals in a peripheral direction of the second end portion of the outer periphery of the fitting main body portion. The first end portion being configured to be heated by a heater and is welded to an end portion of another weld fitting. The positioning scales are configured to define an angular portion of the weld fitting relative to the welding apparatus at the time of welding the first end portion to the first end portion of another weld fitting by matching the positioning scale with a reference mark provided on the clamp portion of the welding apparatus.

7 Claims, 10 Drawing Sheets

(51) Int. Cl.
| | |
|---|---|
| *B23K 37/053* | (2006.01) |
| *B29C 65/78* | (2006.01) |
| *B23K 31/02* | (2006.01) |
| *B29C 65/00* | (2006.01) |
| *B23K 33/00* | (2006.01) |
| *B29C 65/20* | (2006.01) |
| *B29C 65/02* | (2006.01) |
| *B29C 65/14* | (2006.01) |
| *B23K 101/10* | (2006.01) |
| *B23K 101/06* | (2006.01) |
| *B29L 23/00* | (2006.01) |

(52) U.S. Cl.
CPC ...... *B23K 37/0443* (2013.01); *B23K 37/0533* (2013.01); *B29C 65/02* (2013.01); *B29C 65/20* (2013.01); *B29C 65/7817* (2013.01); *B29C 65/7841* (2013.01); *B29C 66/1142* (2013.01); *B29C 66/5221* (2013.01); *B29C 66/52231* (2013.01); *B29C 66/52241* (2013.01); *B29C 66/52251* (2013.01); *B29C 66/73921* (2013.01); *B29C 66/8246* (2013.01); *B23K 2101/06* (2018.08); *B23K 2101/10* (2018.08); *B29C 65/14* (2013.01); *B29C 66/71* (2013.01); *B29L 2023/00* (2013.01); *F16L 2201/60* (2013.01)

(58) Field of Classification Search
CPC ............... F16L 27/0837; F16L 27/0841; F16L 27/0845; F16L 27/0849
USPC ..... 285/93, 179, 181, 288.1, 288.2; 138/104
See application file for complete search history.

(56) References Cited

U.S. PATENT DOCUMENTS

| | | | | |
|---|---|---|---|---|
| 4,077,657 | A * | 3/1978 | Trzeciak | E21B 7/067 175/256 |
| 4,547,096 | A * | 10/1985 | Daigle | B23K 9/0282 228/49.3 |
| 4,949,895 | A * | 8/1990 | Sugiyama | F16L 9/02 228/175 |
| 5,720,501 | A * | 2/1998 | Ortloff | F16L 27/0837 285/181 |
| 6,203,071 | B1 * | 3/2001 | Kingsford | F16L 43/008 285/18 |
| 9,670,731 | B2 * | 6/2017 | Roberts | E21B 7/067 |
| 2012/0222765 | A1 * | 9/2012 | Alexander | F16L 57/00 138/36 |
| 2017/0018209 | A1 * | 1/2017 | Walley, Jr. | G09F 3/0295 |

* cited by examiner

WELD FITTING

TECHNICAL FIELD

The present invention relates to a weld fitting that circulates a liquid, such as a liquid medicine or a cleaning liquid, in mechanical devices.

BACKGROUND ART

As a weld fitting, one having a cylindrical shape, welded to a resin tube in a mechanical device, and having a configuration to circulate a liquid is conventionally known.

To be specific, a weld fitting that includes three cylindrical fitting main body portions, and has one end portions of the three fitting main body portions connected with a fitting central portion, thereby to form a T-shape as a whole, and a weld fitting that includes two cylindrical fitting main body portions, and has one end portions of the fitting main body portions connected with a fitting central portion, thereby to form an L-shape as a whole (an elbow shape) are known.

One end portion of a resin tube is inserted into an inner space formed of an inner peripheral surface of the other end portion of the cylindrical fitting main body portion. The other end portion of the fitting main body portion, into which the one end portion of the resin tube is inserted, is clamped by a clamp device. Then, the other end portion of the fitting main body portion and the one end portion of the resin tube inserted into the other end portion of the fitting main body portion are heated by a heater provided in the clamp device that clamps the other end portion of the fitting main body portion, so that the one end portion of the resin tube and the other end portion of the fitting main body portion are welded (See Patent Document 1).

Patent Document 1: Japanese Unexamined Patent Application, Publication No. 2012-67864

DISCLOSURE OF THE INVENTION

Problems to be Solved by the Invention

In welding the one end portion of the resin tube and the other end portion of the fitting main body portion, the position of the fitting main body portion in a peripheral direction of the fitting main body portion needs to be appropriately matched with the position of the resin tube in a peripheral direction of the resin tube. For example, in Patent Document 1, the fitting main body portion includes an outer peripheral flange and a notched and curved recess. When the fitting main body portion is clamped by the clamp portion, an inserting protrusion is fitted to the notched and curved recess so that the fitting main body portion in the peripheral direction of the fitting main body portion is positioned.

However, the outer peripheral flange and the notched and curved recess exist extremely close to the fitting main body portion to be welded to the resin tube. If the outer peripheral flange and the notched and curved recess exist extremely close to the portion to be welded of the fitting main body portion, the degree of welding of the portion to be welded changes in welding, and the realization of ideal welding with uniformly less beads is difficult.

An objective of the present invention is to provide a weld fitting that enables easy positioning of the fitting main body portion in welding, that can suppress occurrence of change in the degree of welding of the portion to be welded, and that can improve workability of the welding.

Means for Solving the Problems

The present invention relates to a heat-weldable weld fitting including a cylindrical fitting main body portion having an outer periphery that is clamped by a clamp portion of a welding apparatus, wherein the fitting main body portion has an end portion in an axial direction of the fitting main body portion, and the end portion is heated by a heater and is welded to an end portion of another weld fitting, positioning scales exist at equal intervals in a peripheral direction of an outer periphery of the fitting main body portion, in an outer peripheral portion of the fitting main body portion, the outer peripheral portion being not clamped by the clamp portion, and in a portion at an opposite side to the end portion with respect to an peripheral portion of the fitting main body portion, the outer peripheral portion being clamped by the clamp portion, and the weld fitting is welded to the other weld fitting so that the positioning scale is matched with a reference mark provided on the clamp portion.

Further, it is favorable that a marking scale that enables an alternate positioning scale of the positioning scales to be recognizable exists on the outer periphery of the fitting main body portion.

Further, it is favorable that an auxiliary scale that equally divides adjacent positioning scales exists between the adjacent positioning scales.

Further, it is favorable that the positioning scales have a linear shape parallel to the axial direction of the fitting main body portion.

Further, it is favorable that the length of the fitting main body portion in the axial direction is 60 mm or more.

Further, it is favorable that the weld fitting includes a first fitting main body portion, a second fitting main body portion, a third fitting main body portion, and a fitting central portion connecting one end portion of the first fitting main body portion in an axial direction of the first fitting main body portion, one end portion of the second fitting main body portion in an axial direction of the second fitting main body portion, and one end portion of the third fitting main body portion in an axial direction of the third fitting main body portion, and the weld fitting has a T-shape having a positional relationship in which an axial center of the first fitting main body portion is matched with an axial center of the second fitting main body portion, and is perpendicular to an axial center of the third fitting main body portion.

Further, it is favorable that the weld fitting includes two fitting main body portions, and a fitting central portion connecting one end portion of one fitting main body portion in an axial direction of the one fitting main body portion and one end portion of the other fitting main body portion in an axial direction of the other fitting main body portion, and the weld fitting has an elbow shape having a positional relationship in which an axial center of the one fitting main body portion is perpendicular to an axial center of the other fitting main body portion.

Effects of the Invention

According to the present invention, a weld fitting that enables easy positioning of a fitting main body portion in welding can suppress occurrence of change in the degree of welding of a portion to be welded, and can improve the workability of the welding.

PREFERRED MODE FOR CARRYING OUT THE INVENTION

Figure 1:
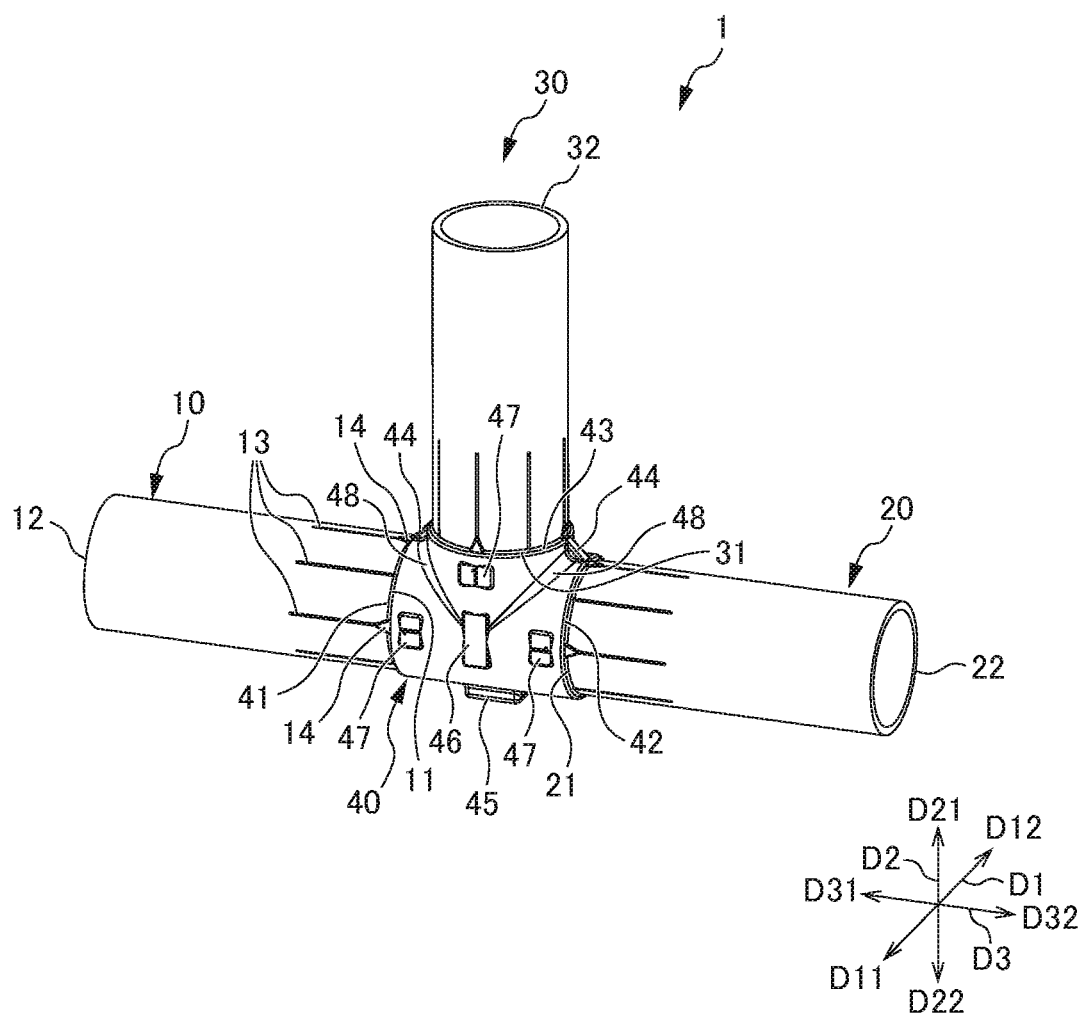
FIG. 1 is a perspective view illustrating a weld fitting 1 according to a first embodiment of the present invention.
Figure 2:
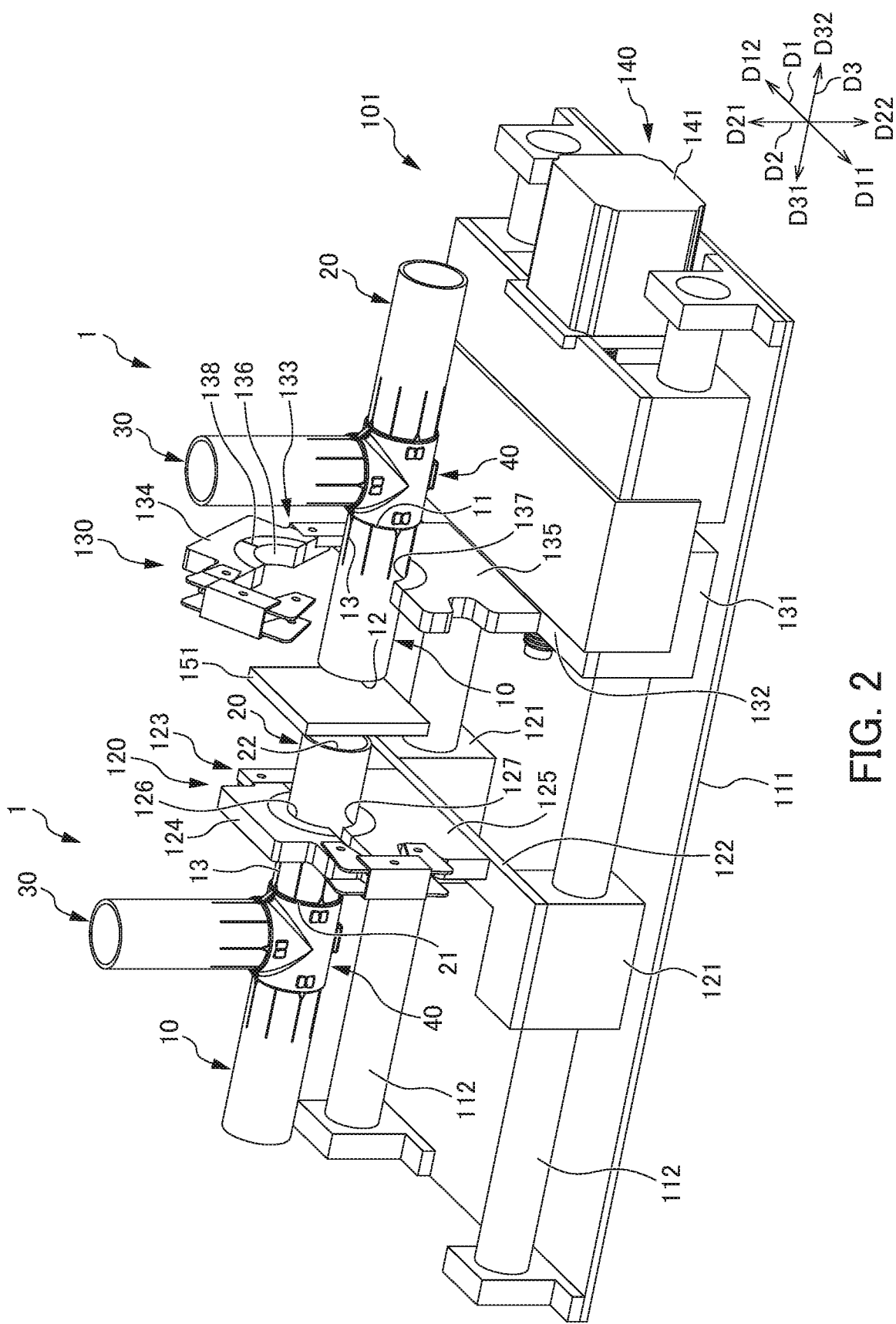
FIG. 2 is a perspective view illustrating a state in which one weld fitting 1 of two weld fittings 1 according to the first embodiment of the present invention is clamped by a first clamp portion 120, and the other weld fitting 1 is about to be clamped by a second clamp portion 130.
Figure 3:
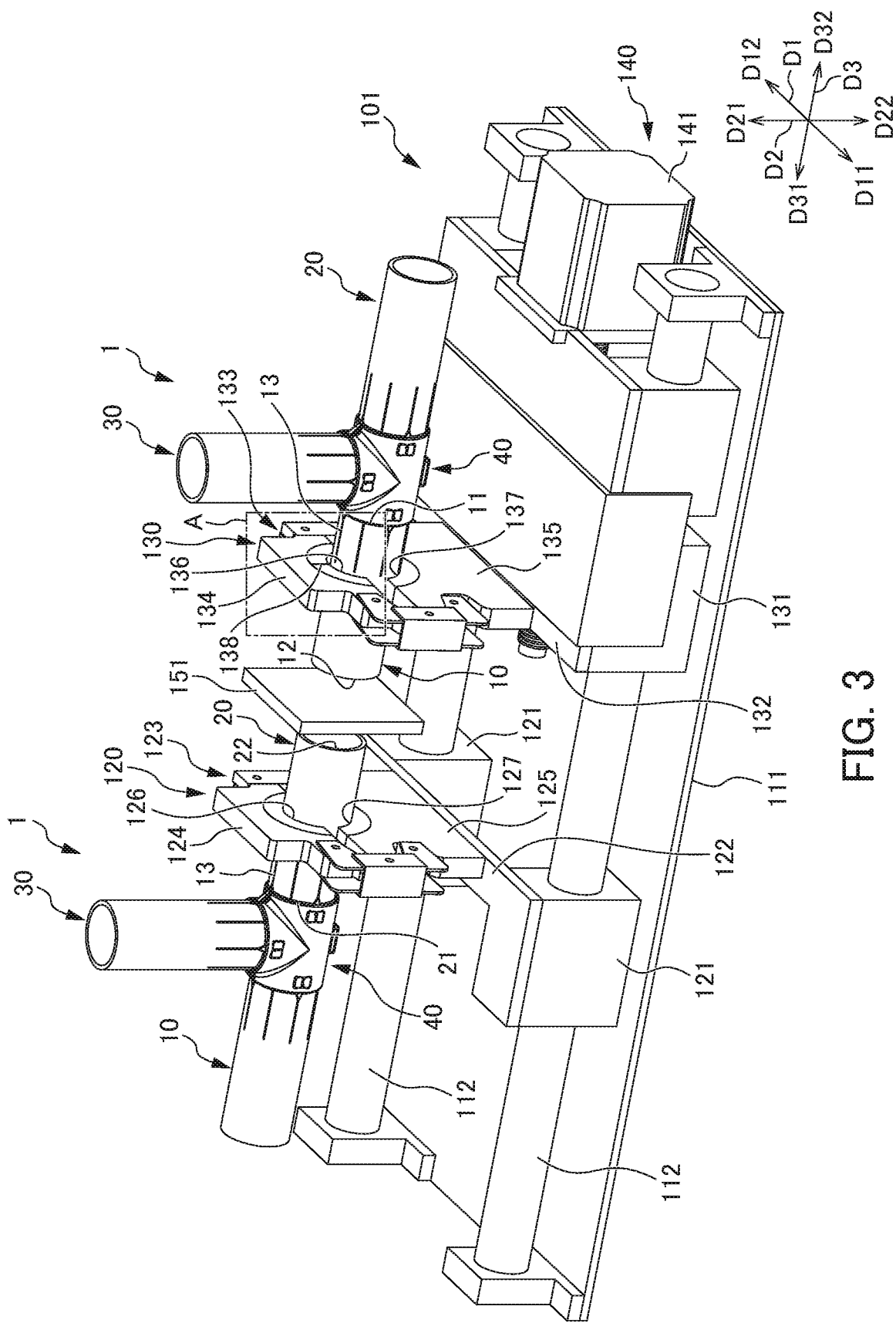
FIG. 3 is a perspective view illustrating a state in which the two weld fittings 1 according to the first embodiment of the present invention are clamped by the first clamp portion 120 and the second clamp portion 130.

Hereinafter, a weld fitting 1 according to a first embodiment of the present invention will be described with reference to the drawings. FIG. 1 is a perspective view illustrating the weld fitting 1 according to the first embodiment of the present invention. FIG. 2 is a perspective view illustrating a state in which one weld fitting 1 of two weld fittings 1 according to the first embodiment of the present invention is clamped by a first clamp portion 120, and the other weld fitting 1 is about to be clamped by a second clamp portion 130. FIG. 3 is a perspective view illustrating a state in which the two weld fittings 1 according to the first embodiment of the present invention are clamped by the first clamp portion 120 and the second clamp portion 130.

Figure 4:
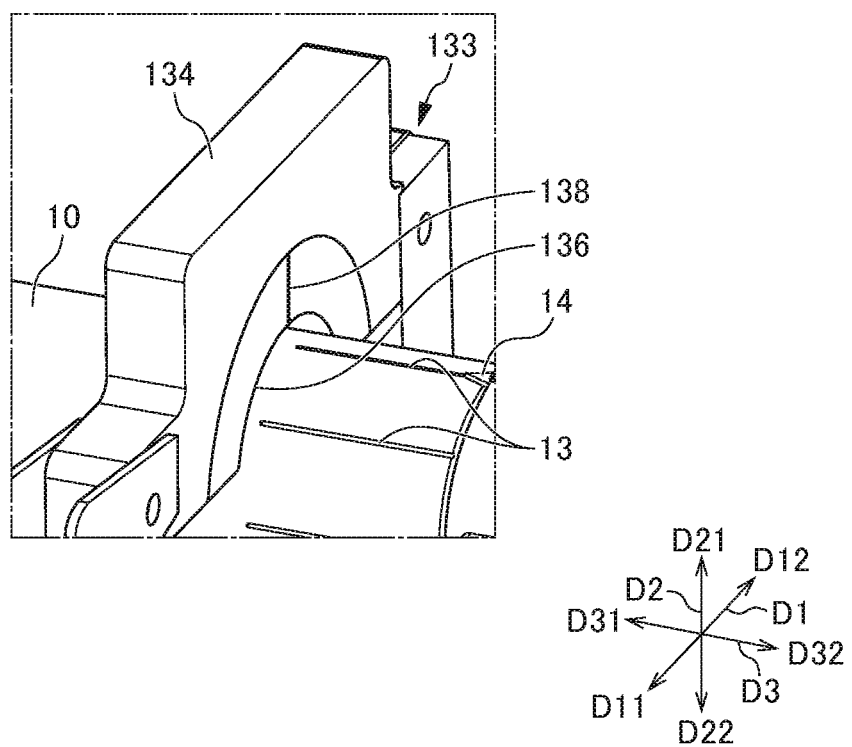
FIG. 4 is an enlarged perspective view illustrating a portion surrounded by a dot-and-dash line A of FIG. 3.
Figure 5:
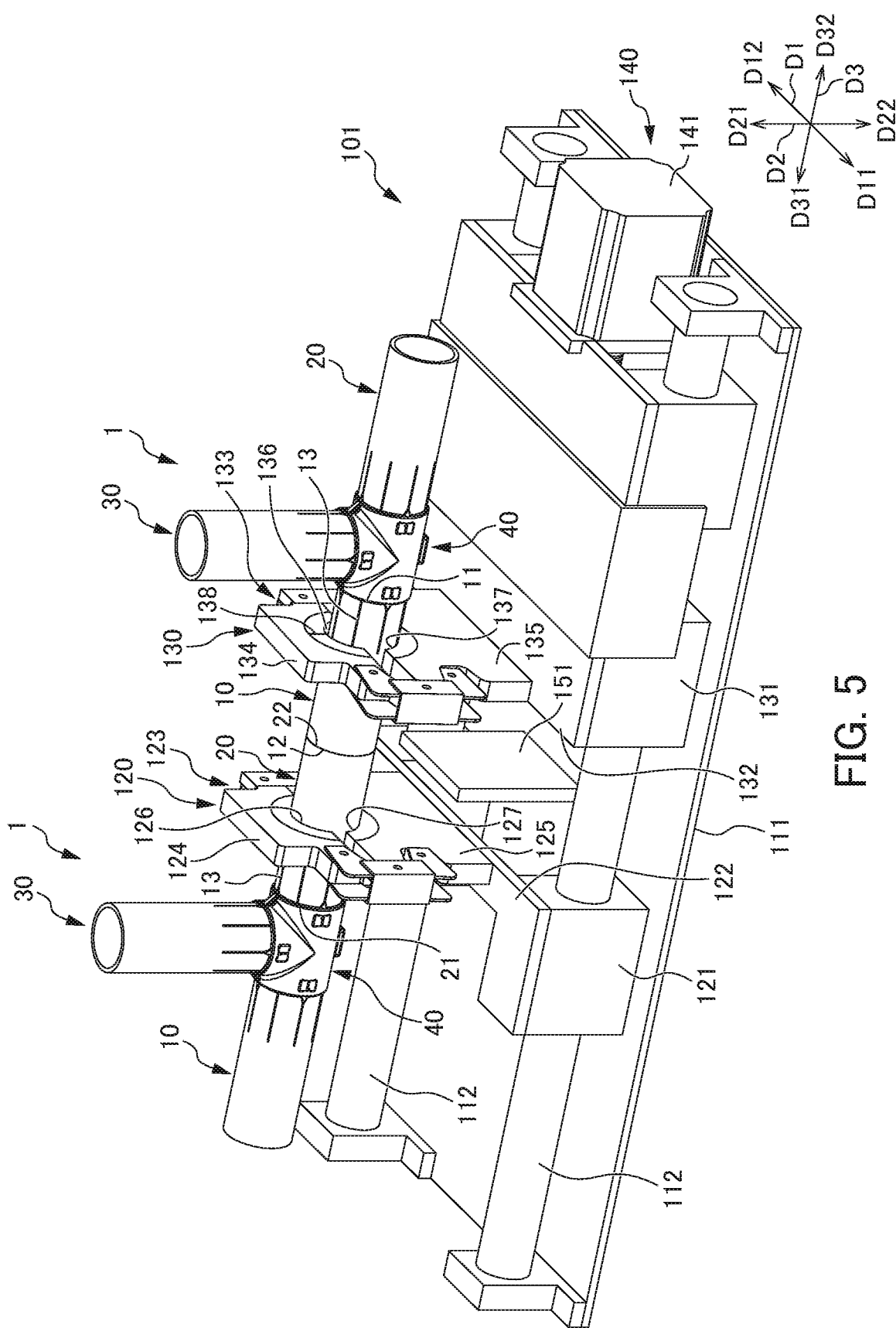
FIG. 5 is a perspective view illustrating a state in which the two weld fittings 1 according to the first embodiment of the present invention are clamped by the first clamp portion 120 and the second clamp portion 130, respectively.
Figure 6:
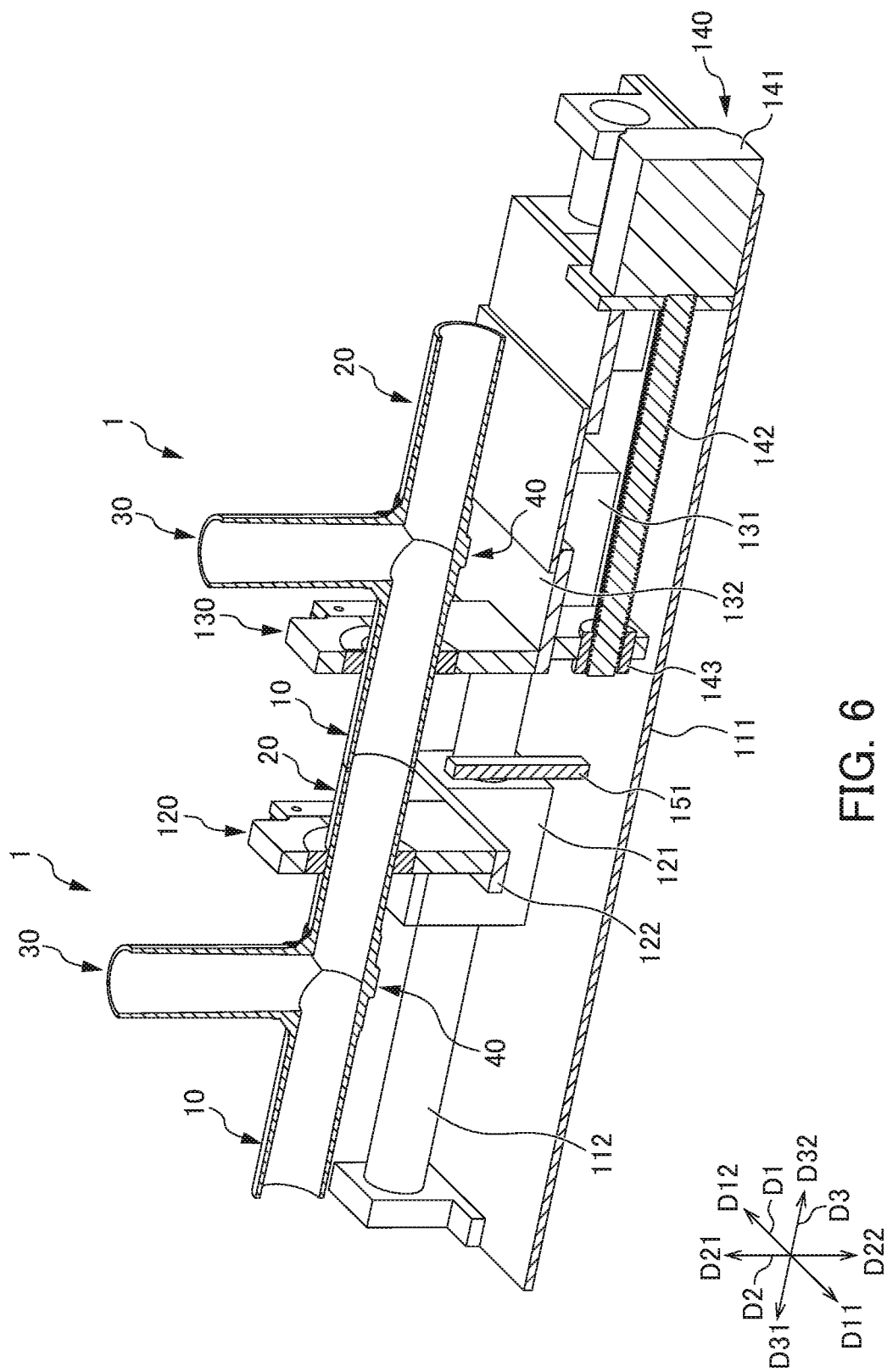
FIG. 6 is a sectional view illustrating a state in which the two weld fittings 1 according to the first embodiment of the present invention are welded in a state of being clamped by the first clamp portion 120 and the second clamp portion 130, respectively.
Figure 7A:
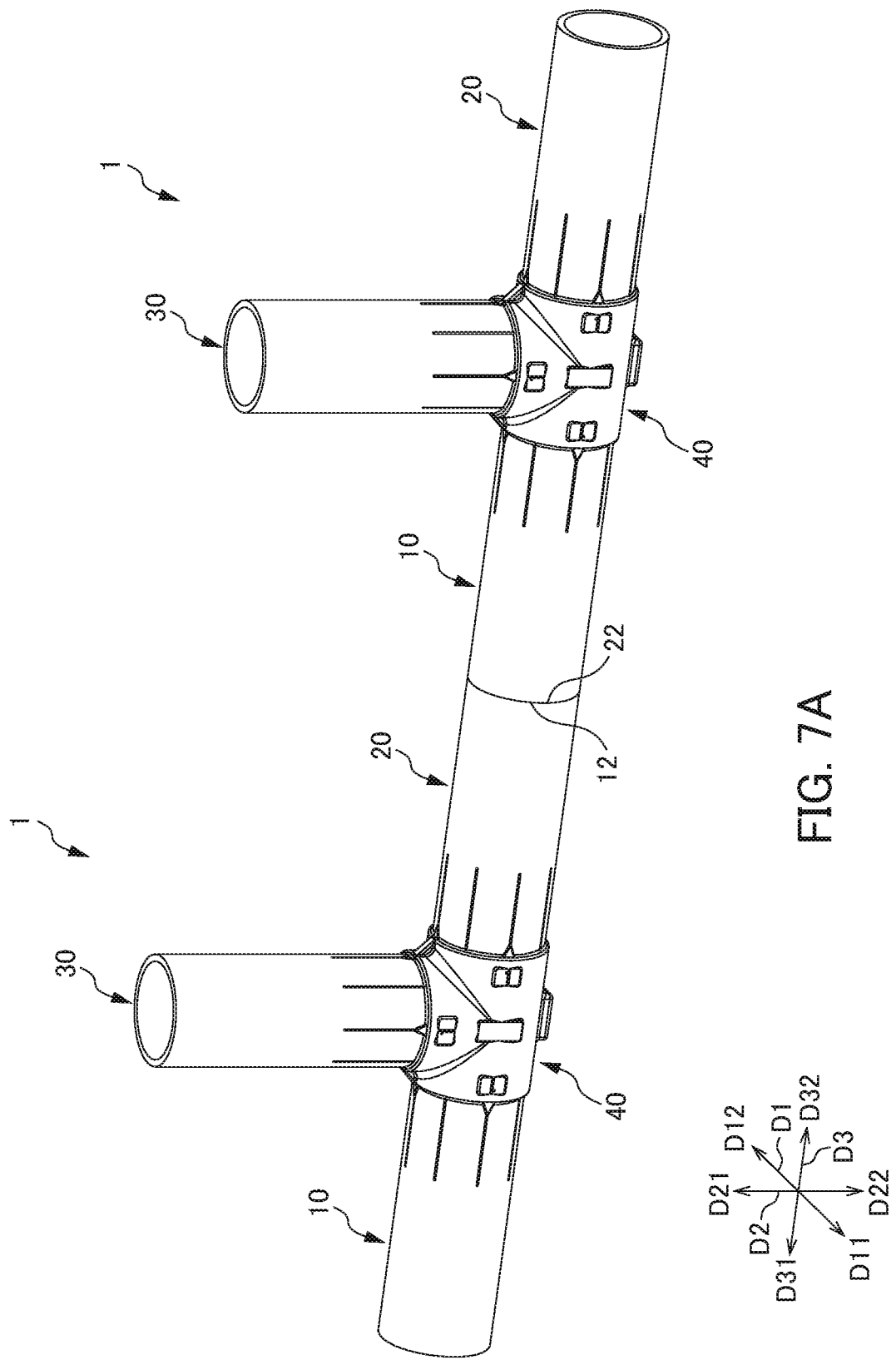
FIG. 7A is a perspective view illustrating a state in which the two weld fittings 1 according to the first embodiment of the present invention are welded.
Figure 7B:
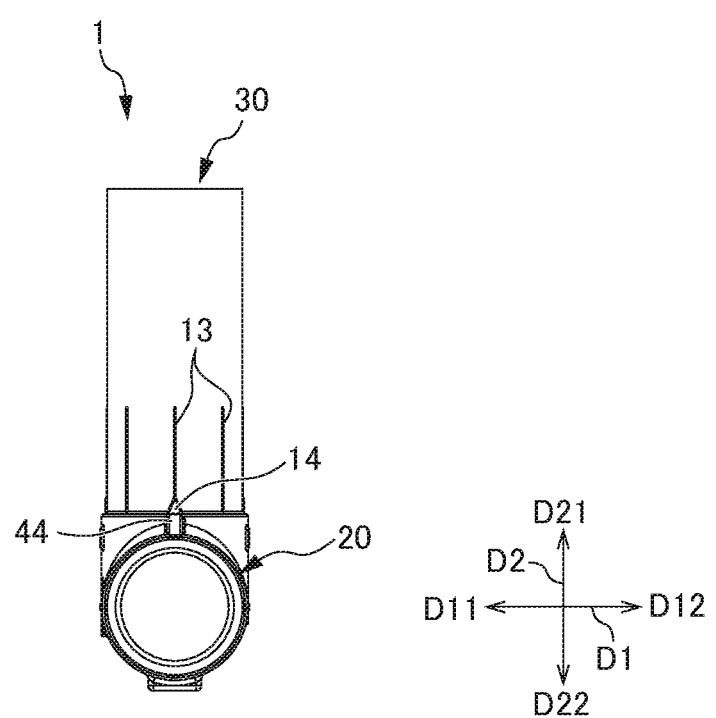
FIG. 7B is a side view illustrating a state in which the two weld fittings 1 according to the first embodiment of the present invention are welded.

FIG. 4 is an enlarged perspective view illustrating a portion surrounded by a dot-and-dash line A of FIG. 3. FIG. 5 is a perspective view illustrating a state in which the two weld fittings 1 according to the first embodiment of the present invention are clamped by the first clamp portion 120 and the second clamp portion 130, respectively. FIG. 6 is a sectional view illustrating a state in which the two weld fittings 1 according to the first embodiment of the present invention are welded in a state of being clamped by the first clamp portion 120 and the second clamp portion 130, respectively. FIG. 7A is a perspective view illustrating a state in which the two weld fittings 1 according to the first embodiment of the present invention are welded. FIG. 7B is a side view illustrating a state in which the two weld fittings 1 according to the first embodiment of the present invention are welded.

Here, for convenience of description, the direction perpendicular to an axial center of a first fitting main body portion 10, an axial center of a second fitting main body portion 20, and an axial center of a third fitting main body portion 30, and the direction from an approximate back surface of the sheet surface of FIG. 1 toward a surface is defined as a front direction D11, the direction opposite to the front direction D11 is defined as a rear direction D12, and these directions are defined as a front and rear direction D1. Further, the direction from one end portion 31 of the third fitting main body portion 30 (hereinafter, referred to as "one end portion 31 of the third fitting main body portion 30") in an axial direction of the third fitting main body portion 30 toward the other end portion 32 of the third fitting main body portion 30 (hereinafter, referred to as "the other end portion 32 of the third fitting main body portion 30") in the axial direction of the third fitting main body portion 30 is defined as an up direction D21, the direction opposite to the up direction D21 is defined as a down direction D22, and these directions are defined as an up and down direction D2. Further, the direction from the second fitting main body portion 20 to the first fitting main body portion 10 (an approximately left direction in FIG. 1) is defined as a left direction D31, the direction opposite to the left direction D31 is defined as a right direction D32, and these directions are defined as a right and left direction D3.

The weld fitting 1 is directly welded to another weld fitting 1, using a plate heater 151 described below, without using members such as nuts and in-cores. The weld fitting 1 includes the first fitting main body portion 10, the second fitting main body portion 20, the third fitting main body portion 30, and a fitting central portion 40. The first fitting main body portion 10, the second fitting main body portion 20, the third fitting main body portion 30, and the fitting central portion 40 are integrally molded with heat-weldable fluororesin that is the same material.

The first fitting main body portion 10, the second fitting main body portion 20, and the third fitting main body portion 30 have the same shape. The second fitting main body portion 20 is arranged symmetrical to the first fitting main body portion 10 in the right and left direction D3. Further, the third fitting main body portion 30 is arranged in a positional relationship in which the axial center of the third fitting main body portion 30 becomes perpendicular to the axial center of the first fitting main body portion 10. Therefore, only the first fitting main body portion 10 will be described, and descriptions of the second fitting main body portion 20 and the third fitting main body portion 30 are omitted.

The first fitting main body portion 10 has a cylindrical shape. The length of the first fitting main body portion 10 in the axial direction (the right and left direction D3) is 60 mm. An outer diameter of the first fitting main body portion 10 has a constant value from one end portion 11 of the first fitting main body portion 10 (hereinafter, referred to as "one end portion 11 of the first fitting main body portion 10") in the axial direction of the first fitting main body portion 10 to reach the other end portion 12 (hereinafter, referred to as "the other end portion 12 of the first fitting main body portion 10"). A value of the outer diameter of the fitting main body portion 10 is φ 25.4 to 12.7 mm, and is φ 25.4 mm in the present embodiment. An inner surface of the first fitting main body portion 10 has a tapered shape increasing in diameter from the one end portion 11 of the first fitting main body portion 10 toward the other end portion 12. That is, the inner surface of the first fitting main body portion 10 increases in diameter from the one end portion 11 of the first fitting main body portion 10 toward the other end portion 12, making an angle of 1° or less with respect to the axial center of the first fitting main body portion 10. A maximum value of the inner diameter in the other end portion 12 of the first fitting main body portion 10 is 22.2 mm.

Positioning scales 13 exist on the one end portion 11 of the first fitting main body portion 10. The positioning scales 13 protrude from an outer surface of the one end portion 11 of the first fitting main body portion 10. The positioning scales 13 extend by about ⅓ of the length of the first fitting main body portion 10 in a longitudinal direction, in the left direction D31 from an end edge of the one end portion 11 of the first fitting main body portion 10 toward an end edge of the other end portion 12, on the outer surface of the one end portion 11 of the first fitting main body portion 10. That is, the positioning scales 13 have a linear shape parallel to the axial direction of the first fitting main body portion 10.

A portion where the positioning scales 13 are provided is an outer peripheral portion of the first fitting main body portion 10, the outer peripheral portion being not clamped by the second clamp portion 130 described below, and is a portion at an opposite side to the other end portion 12 of the first fitting main body portion 10 with respect to an outer peripheral portion of the first fitting main body portion 10, the outer peripheral portion being clamped by the second clamp portion 130, as illustrated in FIG. 3. Eight positioning scales 13 exist at equal intervals in the peripheral direction of the outer periphery of the first fitting main body portion 10, and equally divide one circumference of the outer periphery into eight sections at 45° in a central angle around the axial center of the first fitting main body portion 10.

As illustrated in FIG. 1, marking scales 14 that enable alternate positioning scales 13 of the positioning scales 13 to be recognizable exist on the outer periphery of the first fitting main body portion 10. To be specific, the marking scales 14 are configured from a triangular scale formed at an end portion of the positioning scales 13, in the one end portion 11 of the first fitting main body portion 10. The marking scales 14 are respectively provided at 0°, 90°, 180°, and 270° positions in the central angle around the axial center of the first fitting main body portion 10.

The axial center of the first fitting main body portion 10 has a positional relationship of being matched with the axial center of the second fitting main body portion 20. The axial center of the first fitting main body portion 10 and the axial center of the second fitting main body portion 20 have a positional relationship of being parallel to the right and left direction D3. Further, the axial center of the third fitting main body portion 30 has a positional relationship of being parallel to the up and down direction D2. The one end portion 11 of the first fitting main body portion 10 in the axial direction of the first fitting main body portion 10, one end portion 21 of the second fitting main body portion 20 (hereinafter, referred to as "end portion 21 of the second fitting main body portion 20") in the axial direction of the second fitting main body portion 20, and the one end portion 31 of the third fitting main body portion 30 are closely arranged.

Since the first fitting main body portion 10 is a part of the weld fitting 1, the first fitting main body portion 10 is not provided with parts such as nuts, in-cores, sealing members for being connected with other tubes. Further, the first fitting main body portion 10 is not tapered for sealing a portion where the first fitting main body portion 10 and another tube are connected. Further, the first fitting main body portion 10 is not welded to another tube after the other tube is inserted into a space formed of the inner surface of the first fitting main body portion 10. Instead, as illustrated in FIG. 7A, the other end portion 12 of the first fitting main body portion 10 of the weld fitting 1 on the right side and the other end portion 22 of the second fitting main body portion 20 (hereinafter, referred to as "the other end portion 22 of the second fitting main body portion 20") in the axial direction of the second fitting main body portion 20 of the weld fitting 1 on the left side are welded. Therefore, a projection, a recess, or a step portion is not formed in the inner surface of the first fitting main body portion 10, and the inner surface of the first fitting main body portion 10, as viewed in a cross section including the axial center of the first fitting main body portion 10, has a linear shape.

The fitting central portion 40 connects the one end portion 11 of the first fitting main body portion 10, the one end portion 21 of the second fitting main body portion 20, and the one end portion 31 of the third fitting main body portion 30. To be specific, the fitting central portion 40 has an approximately cylindrical shape opening toward the left direction D31, the right direction D32, and the up direction D21. The one end portion 11 of the first fitting main body portion 10, the one end portion 21 of the second fitting main body portion 20, and the one end portion 31 of the third fitting main body portion 30 are respectively integrally molded with openings 41, 42, and 43 of the fitting central portion 40. Therefore, a space formed of the inner surface of the first fitting main body portion 10, a space formed of an inner surface of the second fitting main body portion 20, and a space formed of an inner surface of the third fitting main body portion 30 communicate into a space formed of an inner surface of the fitting central portion 40. The first fitting main body portion 10, the second fitting main body portion 20, the third fitting main body portion 30, and the fitting central portion 40 are connected as described above so that the weld fitting 1 has a T-shape as a whole.

Size displays 47 that indicate the respective sizes of the first fitting main body portion 10, the second fitting main body portion 20, and the third fitting main body portion 30 to be respectively connected to the three openings 41, 42, and 43 exist on an outer periphery of the fitting central portion 40 near the three openings of the fitting central portion 40. In the present embodiment, the value of the outer diameter of the fitting main body portion 10 is one inch (=φ 25.4 mm). Therefore, a numerical value of "1" is displayed as the size display 47. Further, the opening 43 of the fitting central portion 40, to which the third fitting main body portion 30 is connected, has a positional relationship slightly protruding upward compared with upper ends of the two openings 41 and 42, into which the first fitting main body portion 10 and the second fitting main body portion 20 are connected.

Reinforcing portions 44 are respectively provided to a portion on the outer surface of the fitting central portion 40 between the opening 43 of the fitting central portion 40, to which the third fitting main body portion 30 is connected, and the opening 41 of the fitting central portion 40, to which the first fitting main body portion 10 is connected, and a portion on the outer surface of the fitting central portion 40 between the opening 43 of the fitting central portion 40, to which the third fitting main body portion 30 is connected, and the opening 42 of the fitting central portion 40, to which the second fitting main body portion 20 is connected. The reinforcing portions 44 have a shape that linearly connects the openings 41 and 43, and the openings 42 and 43, and embeds gaps between the straight lines and the outer surface of the fitting central portion 40 in order to prevent the occurrence of cracks between the openings. The reinforcing portions 44 are integrally molded with the fitting central portion 40.

Further, a portion 45 molded with a gate port of a mold (not illustrated) used to mold the weld fitting 1 exists at a lower portion of the fitting central portion 40. Further, a rectangular flat surface 46 for displaying an item number exists on a front surface of the fitting central portion 40.

Further, fleshed-out portions 48 that form boundaries between a cylindrical portion extending in the right and left direction D3 in order to form the openings 41 and 42, and a cylindrical portion extending in the up direction D21 in order to form the opening 43 are formed on the outer surface of the fitting central portion 40.

Welding of the weld fitting 1 according to the above configuration is performed using a welding apparatus 101 as described below. As illustrated in FIG. 2, the welding apparatus 101 includes a base 111, guide bars 112, a first clamp portion 120, a second clamp portion 130, a second clamp portion moving device 140, and the plate heater 151.

The guide bars 112 are configured from two columnar rods having a parallel relationship. The two guide bars 112 are fixed to the base 111. The first clamp portion 120 includes first clamp portion bar fixing portions 121, a first bar fixing portion connecting portion 122, and a first clamp 123. The first clamp portion bar fixing portions 121 are respectively fixed to the two guide bars 112. The first bar fixing portion connecting portion 122 is fixed to the two first clamp portion bar fixing portions 121 to bridge the two first clamp portion bar fixing portions 121.

The first clamp 123 includes an upper-side portion 124 and a lower-side portion 125, and the lower-side portion 125 is fixed to the first bar fixing portion connecting portion 122. The upper-side portion 124 includes an upper-side clamping portion 126 in which a semicircular notch recessed in the up direction D21 and opening toward the down direction D22 is formed. The lower-side portion 125 includes a lower-side clamping portion 127 in which a semicircular notch recessed in the down direction D22 and opening toward the up direction D21 is formed. The upper-side portion 124 is rotatably supported with respect to the lower-side portion 125 by the lower-side portion 125. The upper-side portion 124 is rotated with respect to the lower-side portion 125 so that the upper-side clamping portion 126 and the lower-side clamping portion 127 can be in a state of clamping and not clamping the second fitting main body portion 20.

A reference mark (not illustrated) exists on the upper-side portion 124, similarly to an upper-side portion 134 described in FIG. 4. The reference mark (not illustrated) exists in an uppermost portion of the upper-side clamping portion 126 that comes in contact with the second fitting main body portion 20 and in a central portion in the front and rear direction D1, and has a linear shape extending in the up and down direction D2.

The second clamp portion 130 includes two second clamp portion bar fixing portions 131, a second bar fixing portion connecting portion 132, and a second clamp 133. The second clamp portion bar fixing portions 131 are respectively supported by the two guide bars 112 in a movable manner along the two guide bars 112. Note that only one of the two second clamp portion bar fixing portions 131 appears in FIG. 2. The second bar fixing portion connecting portion 132 is fixed to the two second clamp portion bar fixing portions 131 to bridge the two second clamp portion bar fixing portions 131.

The second clamp 133 includes an upper-side portion 134 and a lower-side portion 135. The lower-side portion 135 is fixed to the second bar fixing portion connecting portion 132. The upper-side portion 134 includes an upper-side clamping portion 136 in which a semicircular notch recessed in the up direction D21 and opening toward the down direction D22 is formed. The lower-side portion 135 includes a lower-side clamping portion 137 in which a semicircular notch recessed in the down direction D22 and opening toward the up direction D21 is formed. The upper-side portion 134 is rotatably supported with respect to the lower-side portion 135. The upper-side portion 134 is rotated with respect to the lower-side portion 135 so that the upper-side portion 134 and the lower-side portion 135 can be in a state of clamping and not clamping the first fitting main body portion 10.

A reference mark 138 exists on the upper-side portion 134. The reference mark 138 exists on an uppermost portion of the upper-side clamping portion 136 that comes into contact with the first fitting main body portion 10 and in a central portion in the front and rear direction D1, and has a linear shape extending in the up and down direction D2. The reference mark 138 provided on the upper-side portion 134 of the second clamp 133 has a positional relationship of being matched with the reference mark (not illustrated) provided on the upper-side portion 124 of the first clamp 123 in the right and left direction D3 on a constant basis. With such a configuration, a certain positioning scale 13 of the marking scale 14 of the third fitting main body portion 30 of the weld fitting 1 on the right side in FIG. 2 is matched with the reference mark (not illustrated) of the first clamp 123, and a certain positioning scale 13 of the marking scale 14 of the first fitting main body portion 10 of the weld fitting 1 on the right side in the FIG. 2 is matched with the reference mark 138 of the second clamp 133. Accordingly, the axis center of the second fitting main body portion 20 of the weld fitting 1 on the left side in FIG. 2 and the axial center of the first fitting main body portion 10 of the weld fitting 1 on the right side in FIG. 2 are matched, and the axial center of the third fitting main body portion 30 of the weld fitting 1 on the left side in FIG. 2 and the axial center of the third fitting main body portion 30 of the weld fitting 1 on the right side in FIG. 2 become parallel.

As illustrated in FIG. 6 and the like, the second clamp portion moving device 140 includes a servo motor 141, a shaft with a screw 142, and a shaft engaging portion 143. The servo motor 141 is electrically connected to a power supply (not illustrated), and can be driven by being supplied with power from the power supply. The shaft with a screw 142 is fixed to an output shaft of the servo motor 141. An axial center of the shaft with a screw 142 has a positional relationship of being parallel to the two guide bars 112. The servo motor 141 is driven so that the shaft with a screw 142 is rotated.

A male screw is threaded in an outer peripheral surface of the shaft with a screw 142, and the shaft engaging portion 143 is screwed with the male screw. The shaft engaging portion 143 is fixed to the second bar fixing portion connecting portion 132. Therefore, the servo motor 141 is driven so that the shaft with a screw 142 is rotated. Accordingly, the shaft engaging portion 143 is integrally moved with the second bar fixing portion connecting portion 132 and the second clamp 133 in the right and left direction D3 that is the axial direction of the guide bar 112.

As illustrated in FIG. 2 and the like, the plate heater 151 has a plate shape parallel to the up and down direction D2 and the front and rear direction D1. The plate heater 151 is supported by a moving support device (not illustrated) that movably supports the plate heater 151 in the up and down direction D2 and the right and left direction D3 in a state maintaining the positional relationship of being parallel to the up and down direction D2 and the front and rear direction D1.

Welding of the weld fittings 1 having the above-described configuration is performed as follows. First, the two weld fittings 1 are prepared. Next, the upper-side portion 124 of the first clamp 123 is rotated, and the second fitting main body portion 20 of the weld fitting 1 on the left side is arranged between the upper-side portion 124 and the lower-side portion 125 of the first clamp 123. Further, the upper-side portion 124 of the first clamp 123 is rotated, and the upper-side portion 124 and the lower-side portion 125 of the first clamp 123 clamp the outer periphery of the second fitting main body portion 20 of the weld fitting 1 on the left side in FIG. 2.

At this time, the portion of the second fitting main body portion 20, the portion being clamped by the first clamp 123, is a portion where no positioning scales 13 are provided, and which is near the positioning scales 13. The upper-side portion 124 and the lower-side portion 125 of the first clamp 123 clamp the second fitting main body portion 20 in a positional relationship matching a certain positioning scale 13 of the marking scale 14 with the reference mark (not illustrated) provided on the upper-side portion 124 of the first clamp 123, similarly to matching a certain positioning scale 13 of the marking scale 14 with reference mark 138 provided on the upper-side portion 134 of the second clamp 133, as described below.

Next, the upper-side portion 134 of the second clamp 133 is rotated, and the first fitting main body portion 10 of the weld fitting 1 on the right side in FIG. 2 is arranged between the upper-side portion 134 and the lower-side portion 135 of the second clamp 133. Further, the upper-side portion 134 of the second clamp 133 is rotated, and the upper-side portion 134 and the lower-side portion 135 of the second clamp 133 clamp the outer periphery of the first fitting main body portion 10 of the weld fitting 1 on the left side, as illustrated in FIG. 3.

At this time, the portion of the first fitting main body portion 10, the portion being clamped by the second clamp 133, is a portion where no positioning scales 13 are provided, and which is near the positioning scale 13. As illustrated in FIG. 4, the upper-side portion 134 and the lower-side portion 135 of the second clamp 133 clamp the first fitting main body portion 10 in the positional relationship matching a certain positioning scale 13 of the marking scale 14 with the reference mark 138 provided on the upper-side portion 134 of the second clamp 133. Note that FIG. 4 illustrates a state immediately before the first fitting main body portion 10 is clamped by the second clamp 133. Therefore, the reference mark 138 and the positioning scale 13 are separated in FIG. 4. When the first fitting main body portion 10 is clamped by the second clamp 133, the reference mark 138 and the positioning scale 13 are matched in side view.

Further, as illustrated in FIGS. 2 and 3, the servo motor 141 is driven, and the second clamp portion 130 is moved in the direction (left direction D31) approaching the first fitting main body portion 10, together with the weld fitting 1 clamped by the second clamp 133. Next, the plate heater 151 is moved and inserted into the position of the axial center of the first fitting main body portion 10, and between the other end portion 12 of the first fitting main body portion 10 of the weld fitting 1 on the right side and the other end portion 22 of the second fitting main body portion 20 of the weld fitting 1 on the left side. Accordingly, the other end portion 22 of the second fitting main body portion 20 and the other end portion 12 of the first fitting main body portion 10 are welded.

Next, the plate heater 151 is retracted from between the other end portion 22 of the second fitting main body portion 20 of the weld fitting 1 on the left side and the other end portion 12 of the first fitting main body portion 10 of the weld fitting 1 on the right side. Next, the servo motor 141 is driven again, and the second clamp portion 130 is moved in the direction (left direction D31) approaching the second fitting main body portion 20 of the weld fitting 1 on the left side, together with the first fitting main body portion 10 clamped by the second clamp 133. Then, as illustrated in FIG. 5, the other end portion 12 of the first fitting main body portion 10 of the weld fitting 1 on the right side is brought into contact with the other end portion 22 of the second fitting main body portion 20 of the weld fitting 1 on the left side. Accordingly, as illustrated in FIG. 7A, the other end portion 12 of the first fitting main body portion 10 of the weld fitting 1 on the right side is welded to the other end portion 22 of the second fitting main body portion 20 of the weld fitting 1 on the left side.

According to the weld fitting 1 of the first embodiment having the above-described configuration, the following effects can be obtained.

As described above, the positioning scales 13 exist at equal intervals in the peripheral direction of the outer periphery of the second fitting main body portion 20, in the outer peripheral portion of the second fitting main body portion 20, the outer peripheral portion being not clamped by the first clamp portion 120, and the portion at the opposite side to the other end portion 22 with respect to the outer peripheral portion of the second fitting main body portion 20, the outer peripheral portion being clamped by the first clamp portion 120. Similarly, the positioning scales 13 exist at equal intervals in the peripheral direction of the outer periphery of the first fitting main body portion 10, in the outer peripheral portion of the first fitting main body portion 10, the outer peripheral portion being not clamped by the second clamp portion 130, and the portion at the opposite side to the other end portion 12 with respect to the outer peripheral portion of the first fitting main body portion 10, the outer peripheral portion being clamped by the second clamp portion 130.

Therefore, the positioning scale 13 of the weld fitting 1 and the reference mark (not illustrated) provided on the first clamp portion 120 are matched and the positioning scale 13 of the weld fitting 1 and the reference mark 138 provided on the second clamp portion 130 are matched, and the one weld fitting 1 and the other weld fitting 1 are welded so that the one weld fitting 1 and the other weld fitting 1 can be easily welded in a positional relationship of being matched with high accuracy in the peripheral direction of the outer peripheries of the second fitting main body portion 20 and the first fitting main body portion 10.

Especially, the weld fittings 1 are directly welded to each other, and thus refinement cannot be performed, compared with a conventional case where a resin tube is connected between the two weld fittings. Therefore, the weld fittings 1 are desired to be welded with higher accuracy. In this case, the one weld fitting 1 and the other weld fitting 1 can be welded so that the one weld fitting 1 and the other weld fitting 1 completely overlap each other in side view, as illustrated in FIG. 7B, in a short work time.

Further, the marking scales 14 that enable the alternate positioning scales 13 of the positioning scales 13 to be recognizable exist on the outer peripheries of the first, second, and third fitting main body portions 10, 20, and 30. Therefore, even if all the shapes of the positioning scales 13 are the same, which angles' positioning scales 13 the central angles around the axial centers of the first, second, and third fitting main body portions 10, 20, and 30 exist can be easily recognized.

Further, the positioning scales 13 have a linear shape parallel to the axial directions of the first, second, and third fitting main body portions 10, 20, and 30. Therefore, visibility can be enhanced, and the reference mark (not illustrated) and the reference mark 138 provided on the clamp portions can be easily matched with the linear positioning scales 13.

The lengths of the first, second, and third fitting main body portions 10, 20, and 30 in the axial directions are 60 mm. Therefore, conventionally, the resin tube is connected between the second fitting main body portion and the first fitting main body portion. However, the second fitting main body portion 20 of the one weld fitting 1 and the first fitting main body portion 10 of the other weld fitting 1 can be directly welded without using the resin tube.

Accordingly, in the case of the conventional weld fitting, two welded portions exist, including the welded portion between the second fitting main body portion of the one weld fitting and one end portion of the resin tube, and the welded portion between the other end portion of the resin tube and the first fitting main body portion of the other weld fitting. However, the number of the welded portions can be one, and can be decreased. As a result, changes in pressure loss of a flow of a liquid medicine or the like that is circulated in the weld fitting 1 and changes in flow speed and flow amount of the liquid medicine due to the bead caused by welding can be suppressed as much as possible. Further, welding work for linking the weld fittings 1 can be made easy because the use of the resin tube can be avoided, and the distance between the weld fittings 1 can be made short.

Further, the weld fitting 1 has the T-shape having the positional relationship of the axial center of the first fitting main body portion 10 being matched with the axial center of the second fitting main body portion 20, and being perpendicular to the axial center of the third fitting main body portion 30. Therefore, the second fitting main body portion 20 of the one weld fitting 1 having the T-shape and the first fitting main body portion 10 of the other weld fitting 1 having the T-shape are welded, so that the two weld fittings 1 can be welded.

Figure 8:
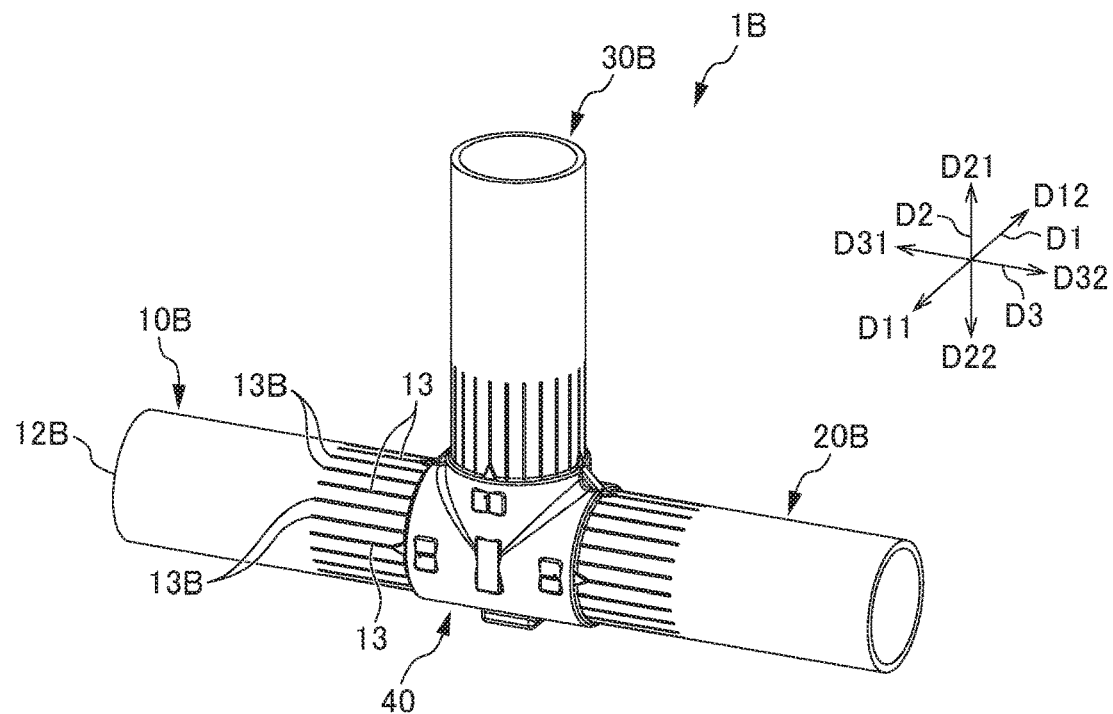
FIG. 8 is a perspective view illustrating a weld fitting 1B according to a second embodiment of the present invention.

Next, a weld fitting according to a second embodiment of the present invention will be described with reference to FIG. 8. FIG. 8 is a perspective view illustrating a weld fitting 1B according to the second embodiment of the present invention. The weld fitting 1B according to the second embodiment is different from the weld fitting 1 according to the first embodiment in that auxiliary scales 13B exist on a first fitting main body portion 10B, a second fitting main body portion 20B, and a third fitting main body portion 30B of the weld fitting 1B according to the second embodiment.

Configurations other than the above point are similar to the first embodiment. Therefore, the same member is denoted with the same reference sign, and a description is omitted. Further, the first fitting main body portion 10B, the second fitting main body portion 20B, and the third fitting main body portion 30B have the same shape. Therefore, only the first fitting main body portion 10B will be described, and a description of the second fitting main body portion 20B and the third fitting main body portion 30B is omitted.

Two auxiliary scales 13B that equally divide adjacent positioning scales 13 into three sections exist in a peripheral direction of an outer surface of the first fitting main body portion 10B. The auxiliary scales 13B have the same shape as the positioning scales 13.

That is, the auxiliary scales 13B protrude from an outer surface of one end portion 11B of the first fitting main body portion 10B. The auxiliary scales 13B extend by a length of about ⅓ of the length of the first fitting main body portion 10B in a longitudinal direction, in the left direction D31 from an end edge of the one end portion 11B of the first fitting main body portion 10B toward an end edge of the other end portion 12B, on the outer surface of the one end portion 11B of the first fitting main body portion 10B. That is, the auxiliary scales 13B have a linear shape parallel to an axial direction of the first fitting main body portion 10B. A portion where the auxiliary scales 13B are provided is an outer peripheral portion of the first fitting main body portion 10B, the outer peripheral portion being not clamped by a second clamp portion 130, and a portion at an opposite side to the other end portion 12B of the first fitting main body portion 10B with respect to an outer periphery of the first fitting main body portion 10B, the outer periphery being clamped by the second clamp portion 130.

According to the weld fitting 1B of the second embodiment having the above-described configuration, the following effects can be obtained. As described above, the auxiliary scales 13B that equally divide the adjacent positioning scales 13 exist between the adjacent positioning scales 13. Therefore, the weld fitting 1B can be easily clamped by a first clamp portion 120 or the second clamp portion 130, in a state where the first, second, and third fitting main body portions 10B, 20B, and 30B are shifted (rotated) by predetermined central angles finer than the positioning scales 13 around the axial centers of the first, second, and third fitting main body portions 10B, 20B, and 30B, in the peripheral directions of the first, second, and third fitting main body portions 10B, 20B, and 30B.

Figure 9:
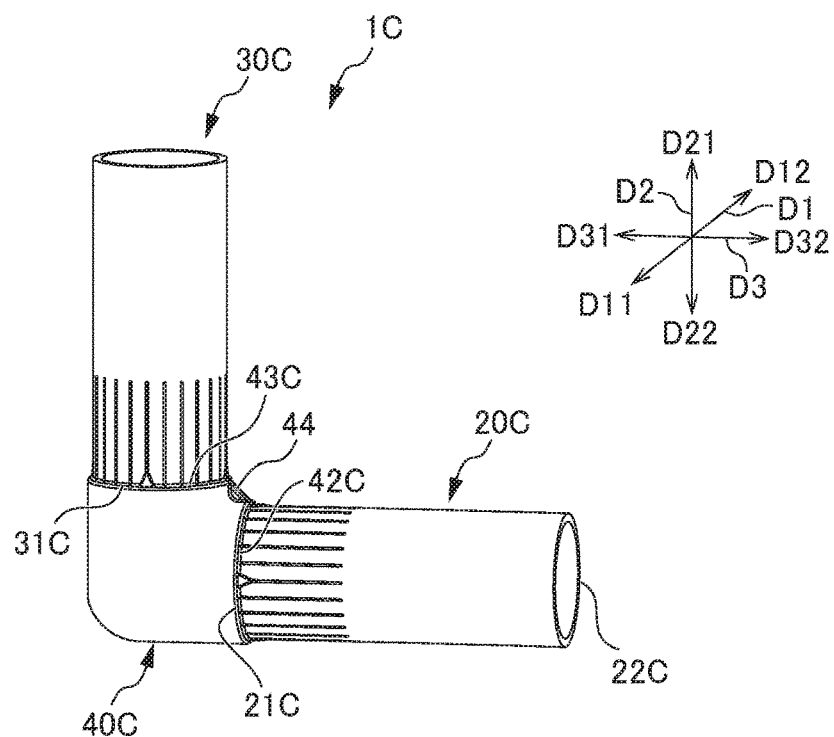
FIG. 9 is a perspective view illustrating a weld fitting 1C according to a third embodiment of the present invention.
Figure 10A:
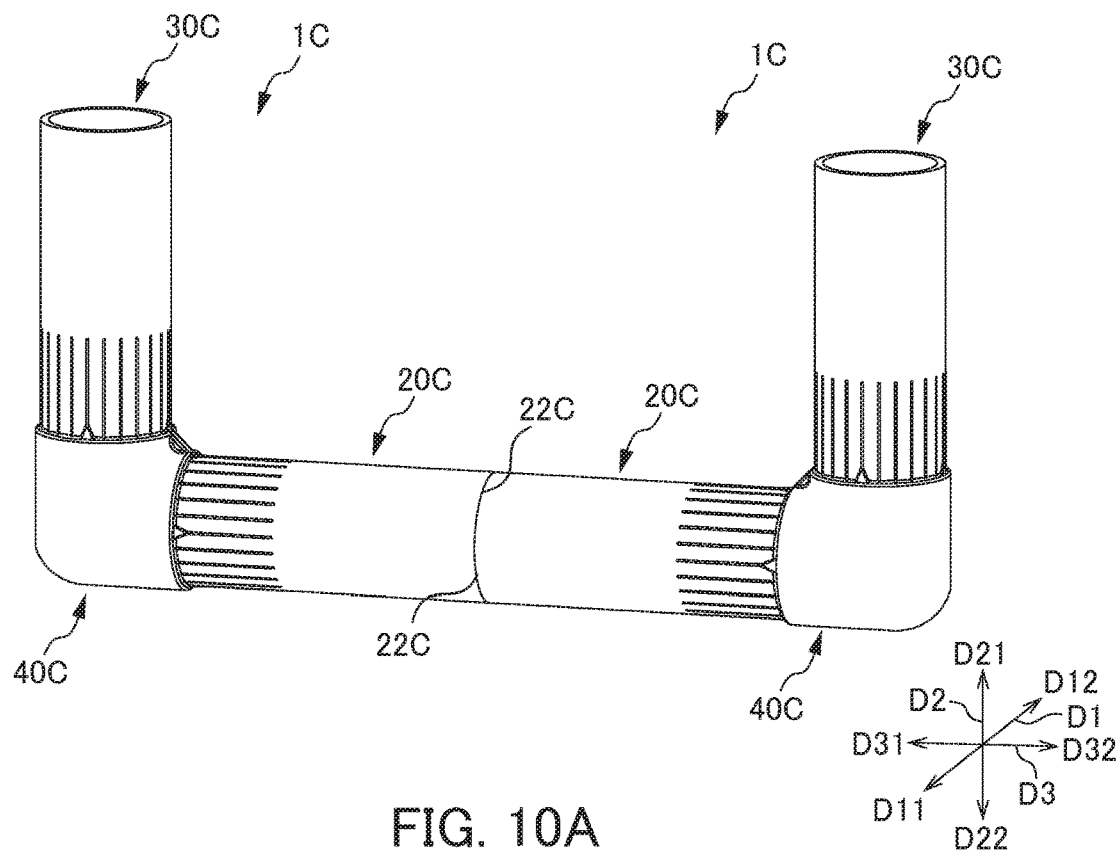
FIG. 10A is a perspective view illustrating a state in which two weld fittings 1C according to the third embodiment of the present invention are welded.
Figure 10B:
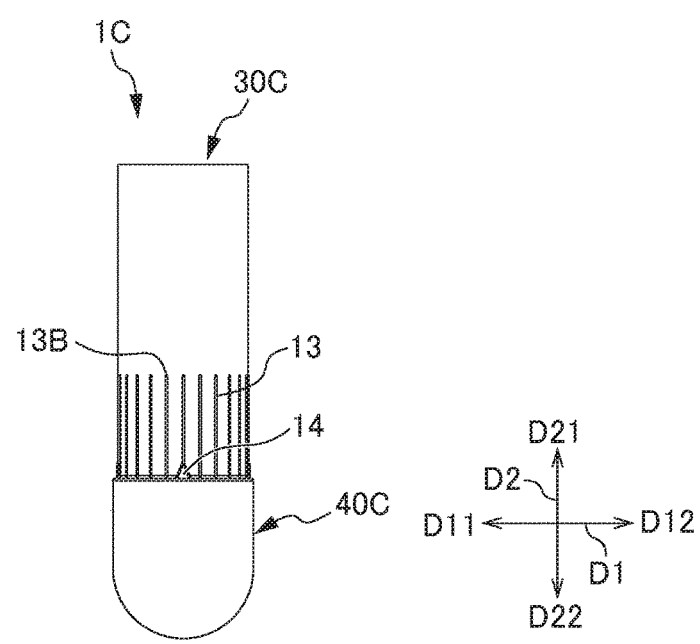
FIG. 10B is a side view illustrating a state in which the two weld fittings 1C according to the third embodiment of the present invention are welded.

Next, a weld fitting according to a third embodiment of the present invention will be described with reference to FIGS. 9, 10A, and 10B. FIG. 9 is a perspective view illustrating a weld fitting 1C according to the third embodiment of the present invention. FIG. 10A is a perspective view illustrating a state in which the two weld fittings 1C according to the third embodiment of the present invention are welded. FIG. 10B is a side view illustrating a state in which the two weld fittings 1C according to the third embodiment of the present invention are welded.

The weld fitting 1C according to the third embodiment is different from the weld fitting 1B according to the second embodiment in that the weld fitting 1C does not have a T-shape as a whole and has an elbow shape (an approximately L-shape), and includes a fitting central portion 40C that is different from the fitting central portion 40. Configurations other than the above points are similar to the second embodiment, and thus the same member is denoted with the same reference sign, and a description is omitted.

The weld fitting 1C has two fitting main body portions 20C and 30C, and a fitting central portion 40C. The two fitting main body portions 20C and 30C are the same as the first fitting main body portion 10B of the weld fitting 1B according to the second embodiment. Therefore, a description is omitted. An axial center of one fitting main body portion 20C of the two fitting main body portions is arranged to have a positional relationship of being perpendicular to an axial center of the other fitting main body portion 30C. One end portion 21C of the one fitting main body portion 20C and one end portion 31C of the other fitting main body portion, of the two fitting main body portions 20C and 30C, are closely arranged. One end portion 22C of the one fitting main body portion 20C, which is opposite from the one end portion 21C, is arranged along the axial direction of the one fitting main body portion 20C.

The fitting central portion 40C has a cylindrical shape bent in an approximately L-shape. The fitting central portion 40C connects the one end portion 21C of the one fitting main body portion 20C and the one end portion 31C of the other fitting main body portion 30C. To be specific, the fitting central portion 40C has an approximately cylindrical shape opening toward the right direction D32 and the up direction D21. The one end portion 21C of the one fitting main body portion 20C and the one end portion 31C of the other fitting main body portion 30C are integrally molded to and connected to openings 42C and 43C of the fitting central portion 40C.

Therefore, a space formed of an inner surface of the one fitting main body portion 20C, and a space formed of an inner surface of the other fitting main body portion 30C communicate into a space formed of an inner surface of the fitting central portion 40C. The one fitting main body portion 20C, the other fitting main body portion 30C, and the fitting central portion 40C are connected as described above so that the weld fitting 1C has the elbow shape (L-shape) as a whole.

According to the weld fitting 1C of the third embodiment having the above-described configuration, the following effects can be obtained. As described above, the weld fitting 1C has the elbow shape having a positional relationship of the axial center of the one fitting main body portion 20C being perpendicular to the axial center of the other fitting main body portion 30C.

Therefore, the fitting main body portions 20C and 20C can be welded to each other so that a certain positioning scale 13 of a marking scale 14 of the fitting main body portion 20C of the one weld fitting 1 is matched with a reference mark (not illustrated) of a first clamp 123 (see FIG. 2), and a certain positioning scale 13 of a marking scale 14 of the fitting main body portion 20C of the other weld fitting 1 is matched with a reference mark 138 of a second clamp 133.

Accordingly, one end portion 22C of the fitting main body portion 20C of the one weld fitting 1C and one end portion 22C of the fitting main body portion 20C of the other weld fitting 1C can be welded, as illustrated in FIG. 10A, in the positional relationship where the fitting main body portion 20C of the one weld fitting 1C and the fitting main body portion 20C of the other weld fitting 1C are matched with high accuracy, in a peripheral direction of an outer periphery of the fitting main body portion 20C. That is, as illustrated in FIG. 10B, the one weld fitting 1C and the other weld fitting 1C can be welded so that the fitting main body portion 30C of the one weld fitting 1C and the fitting main body portion 30C of the other weld fitting 1C completely overlap each other in side view.

The present invention is not limited to the above-described embodiments, and modifications can be made within the technical scope described in the claims. For example, the shape of the weld fitting is not limited to the T-shape or the elbow shape.

Further, the shapes and the dimensions of the fitting main body portions (the first fitting main body portion, the second fitting main body portion, and the third fitting main body portion) and the fitting central portion are not limited to the shapes and the dimensions of the present embodiments. For example, the length of the first fitting main body portion 10 in the axial direction has been 60 mm. However, the length is not limited to this value. The length of the first fitting main body portion in the axial direction may just be 60 mm or more. The marking scale 14 can recognize the alternate positioning scale 13 of the positioning scales 13. However, the recognizable positioning scale is not limited to the alternate positioning scale.

Further, the first fitting main body portion 10, the second fitting main body portion 20, the third fitting main body portion 30, and the fitting central portion 40 have been integrally formed of the same material, a heat-weldable fluororesin. However, the material is not limited thereto. For example, a polyvinyl chloride resin, polypropylene, polyacetal, polyether ether ketone, or the like may be used.

EXPLANATION OF REFERENCE NUMERALS

1 Weld fitting
10 First fitting main body portion
11 One end portion
12 The other end portion
13 Positioning scale
13B Auxiliary scale
14 Marking scale
20 Second fitting main body portion
20C One fitting main body portion
13 Third fitting main body portion
30C The other fitting main body portion
40 and 40C Fitting central portion
101 Welding apparatus
120 First clamp portion
130 Second clamp portion
138 Reference mark
151 Plate heater (heater)

The invention claimed is:

1. A heat-weldable weld fitting, comprising:
a cylindrical fitting main body portion having:
an outer periphery including a first end portion and a second end portion opposite from the first end portion, and a middle section between the first end portion and the second end portion that is configured to be clamped by a clamp portion of a welding apparatus, the first end portion and the second end portion being arranged along an axial direction of the fitting main body portion, and the first end portion being configured to be heated by a heater and is welded to an end portion of another weld fitting,
positioning scales formed at equal intervals in a peripheral direction of the second end portion of the outer periphery of the fitting main body portion, the second end portion being configured to be not clamped by the clamp portion,
wherein the positioning scales are configured to define an angular position of the weld fitting relative to the welding apparatus at the time of welding the first end portion to the first end portion of another weld fitting,
wherein each positioning scale matches with a reference mark provided on the clamp portion of the welding apparatus,
wherein the positioning relationship is defined by the weld fitting fully overlapping another weld fitting, and
wherein no positioning scale is provided at the end portion of the weld fitting.

2. The weld fitting according to claim 1, further comprising:
a marking scale that is formed at the second end portion of the outer periphery of the fitting main body portion and that enables an additional indication to the positioning scales.

3. The weld fitting according to claim 1, wherein
an auxiliary scale that equally divides adjacent positioning scales exists between the adjacent positioning scales.

4. The weld fitting according to claim 1, wherein
the positioning scales have a linear shape parallel to the axial direction of the fitting main body portion.

5. The weld fitting according to claim 1, wherein
a length of the fitting main body portion in the axial direction is 60 mm or more.

6. The weld fitting according to claim 1, comprising:
a first fitting main body portion;
a second fitting main body portion;
a third fitting main body portion; and
a fitting central portion connecting one end portion of the first fitting main body portion in an axial direction of the first fitting main body portion, one end portion of the second fitting main body portion in an axial direction of the second fitting main body portion, and one end portion of the third fitting main body portion in an axial direction of the third fitting main body portion, and the weld fitting having
a T-shape having a positional relationship in which an axial center of the first fitting main body portion is matched with an axial center of the second fitting main body portion, and is perpendicular to an axial center of the third fitting main body portion.

7. The weld fitting according to claim 1, comprising:
two fitting main body portions; and
a fitting central portion connecting one end portion of one fitting main body portion in an axial direction of the one fitting main body portion and one end portion of an other fitting main body portion in an axial direction of the other fitting main body portion, and the weld fitting having
an elbow shape having a positional relationship in which an axial center of the one fitting main body portion is perpendicular to an axial center of the other fitting main body portion.

* * * * *